(12) United States Patent
Ernest et al.

(10) Patent No.: US 9,729,054 B2
(45) Date of Patent: Aug. 8, 2017

(54) INTERLEAVED SOFT SWITCHING BOOST CONVERTER

(71) Applicant: General Electric Company, Schenectady, NY (US)

(72) Inventors: Philippe Ernest, Gif / Yvette (FR); Yannick Louvrier, Bois d'Arcy (FR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 264 days.

(21) Appl. No.: 14/574,505

(22) Filed: Dec. 18, 2014

(65) Prior Publication Data

US 2015/0180340 A1 Jun. 25, 2015

(30) Foreign Application Priority Data

Dec. 20, 2013 (FR) ...................................... 13 63270

(51) Int. Cl.
 *H05G 1/32* (2006.01)
 *H02M 3/158* (2006.01)

(52) U.S. Cl.
 CPC ......... *H02M 3/158* (2013.01); *H02M 3/1584* (2013.01); *H05G 1/32* (2013.01); *H02M 2003/1586* (2013.01)

(58) Field of Classification Search
 CPC .. H05G 1/10; H05G 1/30; H05G 1/32; H05G 1/34; H05G 1/56; H05G 1/26; H02M 3/158
 USPC .................. 378/101, 109, 110, 114; 323/271
 See application file for complete search history.

(56) References Cited

U.S. PATENT DOCUMENTS

2010/0253295 A1 10/2010 Tan et al.
2013/0027126 A1 1/2013 Jayaraman et al.

OTHER PUBLICATIONS

Martins et al., "Control Strategy for the Double-Boost Converter in Continuous Conduction Mode Applied to Power Factor Correction", IEEE Power Electronics Specialists Conference, vol. No. 02, pp. 1066-1072, Jun. 23-27, 1996.
Lin et al., "Single-phase Three-Level PWM Rectifier", Proceedings of the IEEE International Conference on Power Electronics and Drive Systems, vol. No. 01, pp. 63-68, Jul. 27-29, 1999.
Pejovic, "A Simple Control Circuit for Dual Boost Rectifier Providing Sinusoidal Input Currents", 8th European Conference on Power Electronics and Applications, pp. 1-6, Sep. 7, 1999.
Guillaume et al., "New Soft Switching ZVS and ZCS Half-Bridge Inductive DC-DC Converters for fuel Cell Applications", Conf. IEEE CIEP, pp. 1-6, Oct. 2006.

(Continued)

*Primary Examiner* — Jurie Yun
(74) *Attorney, Agent, or Firm* — GE Global Patent Operation; Marc A. Vivenzio

(57) ABSTRACT

An interleaved double boost converter including two simple boost converters each having a diode, an input inductor, a switch connected to the anode of the diode and a filter capacitor connected to the cathode of the diode, the two switches and the two filter capacitors being connected at a mid-point, the interleaved double boost converter further including a control circuit controlling the switches adapted to control: at a first phase, the opening of a first switch the other remaining closed, both switches initially being closed; at a second phase, the opening of the second switch which had remained closed; and at a third phase, the closing of both switches.

12 Claims, 5 Drawing Sheets

(56) References Cited

OTHER PUBLICATIONS

Ivanes, A et al., "Comparison of Two Soft Switching DC-DC Converters for Fuel Cell Applications", Conference Record of the IEEE Industry Applications Conference, vol. No. 05, pp. 2121-2128, Oct. 8-12, 2006.
Lock et al., "Improved Hysteresis Current Control of a Single Phase, Three Level, Double PFC Converter", PESC IEEE, pp. 1326-1330, Orlando, FL, Jun. 17-21, 2007.
Unofficial English Translation of French Search Report issued in connection with corresponding FR Application No. 1363270 on Nov. 6, 2014.

INTERLEAVED SOFT SWITCHING BOOST CONVERTER

FIELD OF THE INVENTION

Embodiments of the present invention concern Boost converters also known as step-up converters. Embodiments of the present invention are adapted in particular to the field of X-ray radiography powered by battery or other energy storage device.

BACKGROUND

With reference to FIGS. 1 and 2, a simple Boost converter 200 comprises a voltage source 21 having a first and second terminal (here one terminal+ground), an inductor 23 whose first terminal is connected to the +terminal of the voltage source 21, a diode 24 whose anode is connected to the second terminal of the inductor 23, a current switch 26 such as a MOSFET field effect transistor connected between the second terminal of the inductor 23 and the ground.

The functioning of the simple Boost converter 200 can be divided into two separate phases depending on the status of the switch 26: an energy accumulation phase (FIG. 1) and an energy transfer phase (FIG. 2). During the energy accumulation phase (FIG. 1), the switch 26 is closed (on-state), this leading to an increase in current in the inductor 23 and hence the storing of a quantity of energy in the form of magnetic energy. The diode 24 is then blocked and the load 27 is disconnected from the power supply. During the energy transfer phase (FIG. 2), the switch 26 is open, the inductor 23 then being in series with the generator and its electromotive force is added to that of the generator (booster effect). The current passing through the inductor then passes through the diode 24 and the load 27. As a result, a transfer occurs of the energy accumulated in the inductor 23 towards the load 27.

With reference to FIG. 3, to improve on the performance of a simple Boost converter regarding the rated voltage, a structure called an interleaved double BOOST converter 300 has been proposed. It is the combination of two simple Boost circuits having the mid-points of the switches 26 and filter capacitors 25 connected both to one another and to the terminals of the load 27 (FIG. 3), the controls of the switches being shifted by a half-period (see FIG. 4 which illustrates the status of the first switch at the top, the status of the second switch in the middle and underneath the inductor current).

One disadvantage of this type of converter is that its yield decreases with increases in operating frequency, whereas in contradiction it is preferable to choose high operating frequencies of the order of 100 kHz to 1 MHz, to reduce the size and volume of the converter. It is well known that a reduction in yield with an increase in operating frequency is notably caused by energy losses in the switches 24 and diodes 26 during the switching periods, such switching then commonly being called hard switching.

To overcome this shortcoming it has been proposed to add capacitors called snubber capacitors in parallel with the switches, which makes it possible to soften switching. The adding of these snubber capacitors allows solving of the problem of switching losses on opening of the switches, but does not allow solving of the problem of switching losses on closing of the switches. Since the snubber capacitors are charged on opening of a switch, they become discharged on closing thereby aggravating switching losses on closure of the switches.

Such switching leads to an energy loss that is all the more sensitive the higher the frequency. Additionally, the voltage front on closing of the switches translates as the emitting of parasitic electromagnetic radiation.

SUMMARY OF THE INVENTION

With an embodiment of the present invention, at least one of the aforementioned drawbacks can be overcome by proposing an interleaved double boost converter comprising two simple boosters each having a diode, an input inductor, a switch connected to the anode of the diode and a filter capacitor connected to the cathode of the diode, the two switches and the two filter capacitors being connected at a mid-point; the interleaved double boost converter being characterized in that it further comprises a switch control circuit adapted to control:

at a first phase, the opening of a first switch the other remaining closed, both switches initially being closed;

at a second phase, the opening of the second switch which has remained closed;

and at a third phase the closing of both switches.

Embodiments of the present invention include the following characteristics, taken individually or in any possible technical combination thereof:

the interleaved double boost converter further comprises a snubber capacitor placed in parallel with each of the switches;

the interleaved double boost converter further comprises a current sensor measuring the inductor current and feeding the measured values to the control circuit;

the control circuit is formed of a circuit regulating the voltage at the terminals of the load, and of a control circuit incorporating a state machine based on variables in voltage status at the terminals of the load and on inductor current;

the control circuit is adapted to trigger the opening of the first switch when the inductor current $I_L$ moves above a first threshold value fixed by the circuit regulating the voltage at the load terminals;

the control circuit is adapted to trigger the opening of the second switch when the inductor current $I_L$ falls below a second threshold value;

the cathodes of the diodes are connected to a load, the second threshold value also being fixed as a function of the value of the load;

the closing of the two switches is simultaneous;

the control circuit controls the simultaneous closing of both switches when the inductor current $I_L$ falls below a negative third threshold value;

the second and/or third threshold value is chosen with a certain degree of freedom as a function of the load to be powered, for the purpose of optimising the performance of the circuit e.g. to reduce peak current in the inductor or to limit the maximum operating frequency.

It is necessary that the interleaved double boost converter should have a step-up ratio of more than 2.

According to another aspect, the present invention also proposes the application of an interleaved double boost converter to the high voltage powering of an X-ray generator.

BRIEF DESCRIPTION OF THE DRAWINGS

Other objectives, characteristics and advantages will become apparent from the following detailed description with reference to the drawings given as non-limiting illustrations among which.

DETAILED DESCRIPTION OF THE INVENTION

Figure 1:
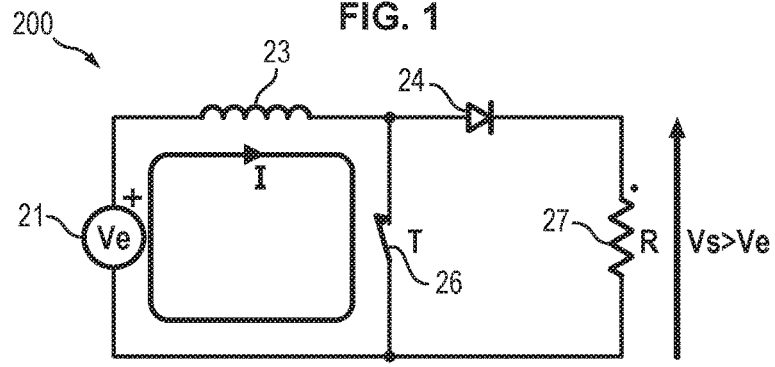
FIG. 1 illustrates a simple boost converter of the prior art in accumulation phase.
Figure 2:
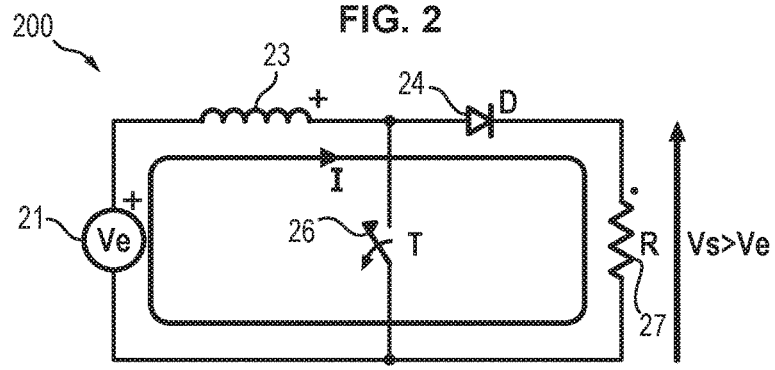
FIG. 2 illustrates a simple boost converter of the prior art in energy transfer phase.
Figure 3:
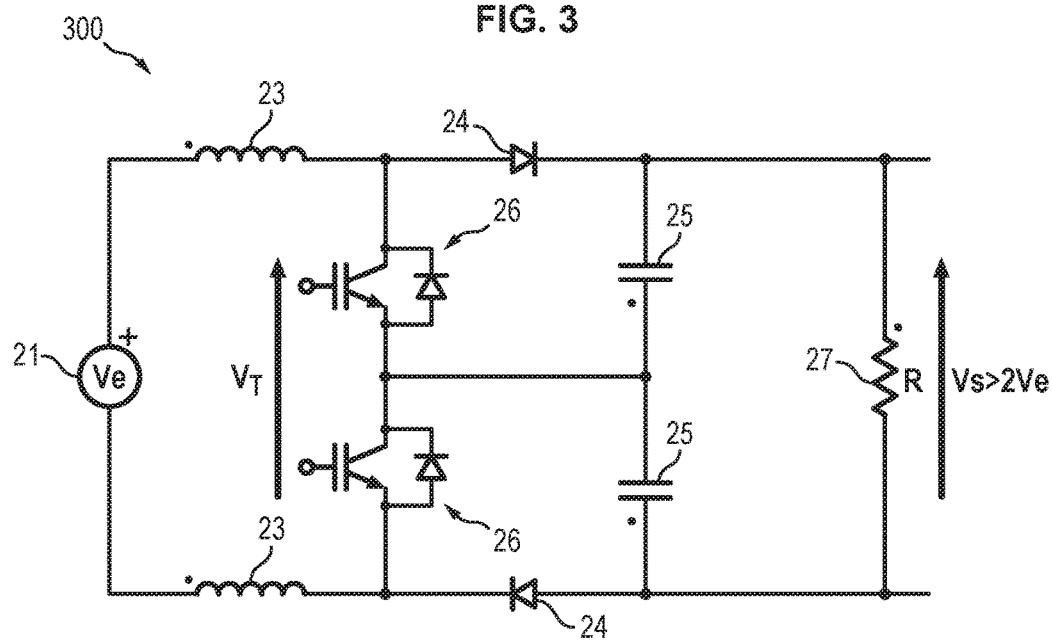
FIG. 3 illustrates an interleaved double boost converter of the prior art.
Figure 4:
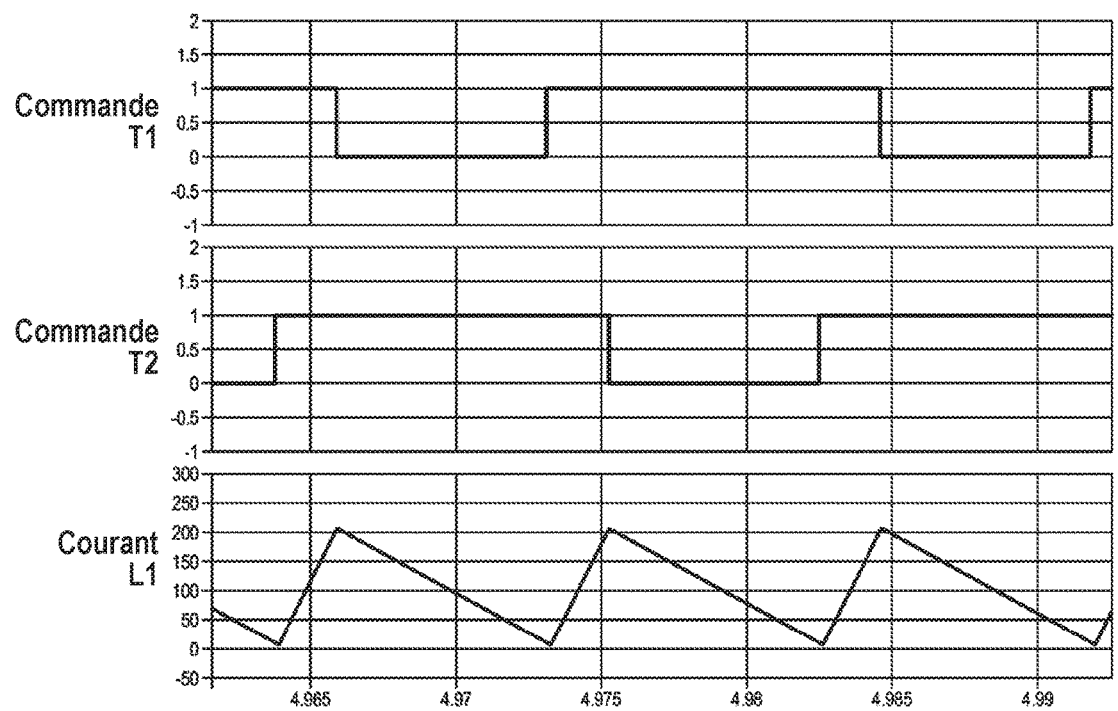
FIG. 4 illustrates the sequencing of the switches of an interleaved double boost converter in the prior art.
Figure 5:
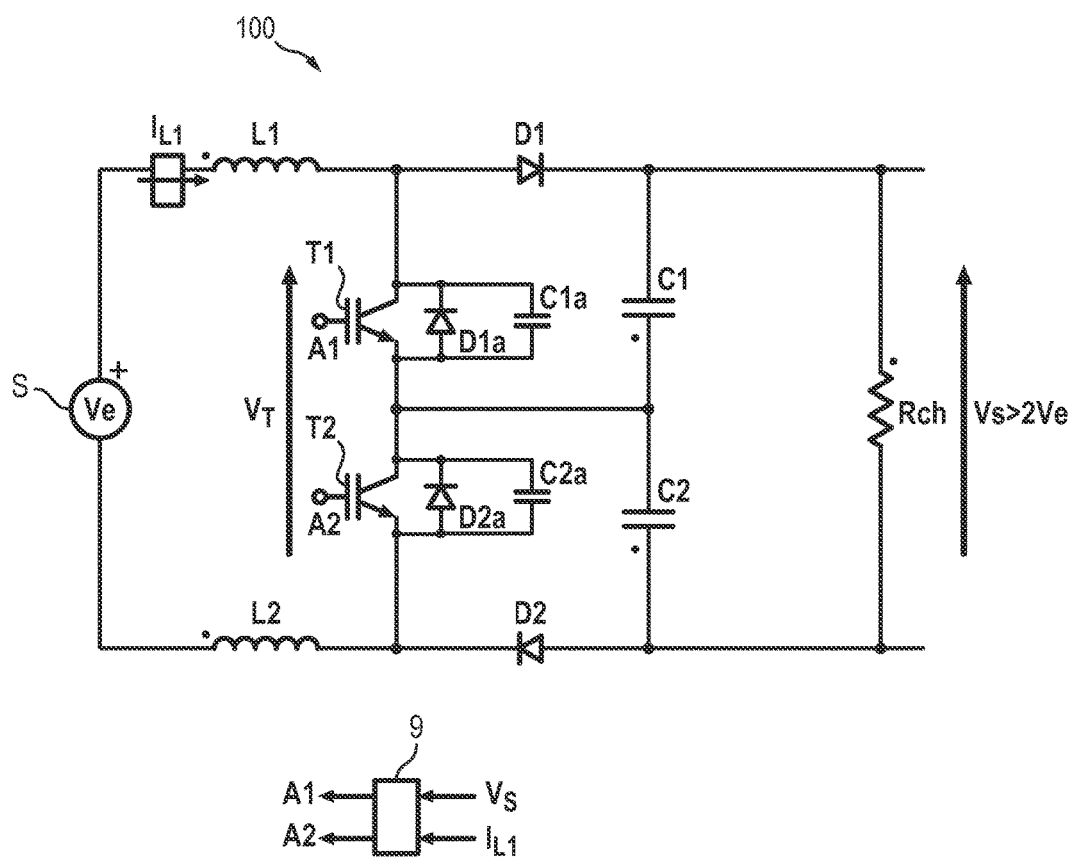
FIG. 5 illustrates an interleaved double booster conforming to an embodiment of the present invention.

With reference to FIG. 5, an interleaved double boost converter 100 comprises a voltage source Ve, a positive boost converter and a negative boost converter.

The positive boost converter comprises a first inductor L1 whose first terminal is connected to the positive terminal of the said voltage source Ve, a first diode D1 whose anode is connected to the second terminal of the said first inductor L1, a first filter capacitor C1 whose first terminal is connected to the cathode of the said first diode D1, a first current switch T1 connected between the said second terminal of said first inductor L1 and a mid-point but not connected to the mid-point of the power source. The negative boost converter comprises a second inductor L2 whose first terminal is connected to the negative terminal of said voltage source Ve, a second diode D2 whose anode is connected to the second terminal of said second inductor L2, a second filter capacitor C2 whose first terminal is connected to the cathode of said second diode D2, a second switch T2 connected between the said second terminal of said inductor L2 and the mid-point, but not being connected to the mid-point of the power source. A load Rch is connected between the cathodes of the two diodes D1 and D2.

A snubber capacitor C1a and C2a is placed in parallel with each switch T1 and T2. A diode D1a (respectively D2a) is advantageously placed in parallel with switch T1 (respectively T2).

In practice, the switches T1 and T2 are electronic switches such as MOS or IGBT transistors. The switches T1 and T2 and diodes D1 and D2 only have to withstand one half of the voltage at the terminals of the load (Vs/2), which usually allows the choice of 600 V components and not 1200 V as in a simple boost converter or parallel interleaved boost converters, with better performance and at lower cost.

If the voltage at the terminals of the load Rch is written Vs, the step-up ratio Vs/Ve, defined as the ratio of the voltages at the terminals of the source Ve and of the load Rch, is chosen to be higher than 2.

The inductors L1 and L2 have been described as two separate inductors for reasons of clarity but they may be grouped together in only one inductor or they may be two separate windings on one same magnetic circuit.

The interleaved double boost converter 100 also comprises a control circuit 9 giving control signals A2 and A3 to control inputs of the switches T1 and T2 respectively.

The controlling of the switches T1 and T2 is performed by the control circuit 9, formed for example by a circuit regulating the voltage Vs at the terminals of the load Rch and a control circuit incorporating a state machine based on variables in the voltage Vs status at the terminals of the load and on the inductor current $I_L$ as provided by one or more current sensors 11 and 12 measuring the current $I_L$ circulating in the inductors L1 and L2, these measured values being fed to the control circuit 9.

The control circuit 9 of the switches T1 and T2 is adapted so that at a first phase it controls the opening of one of the switches, the other remaining closed, both switches initially being closed, at a second phase it opens the switch which has remained closed and at a third step it closes both switches.

Figure 6:
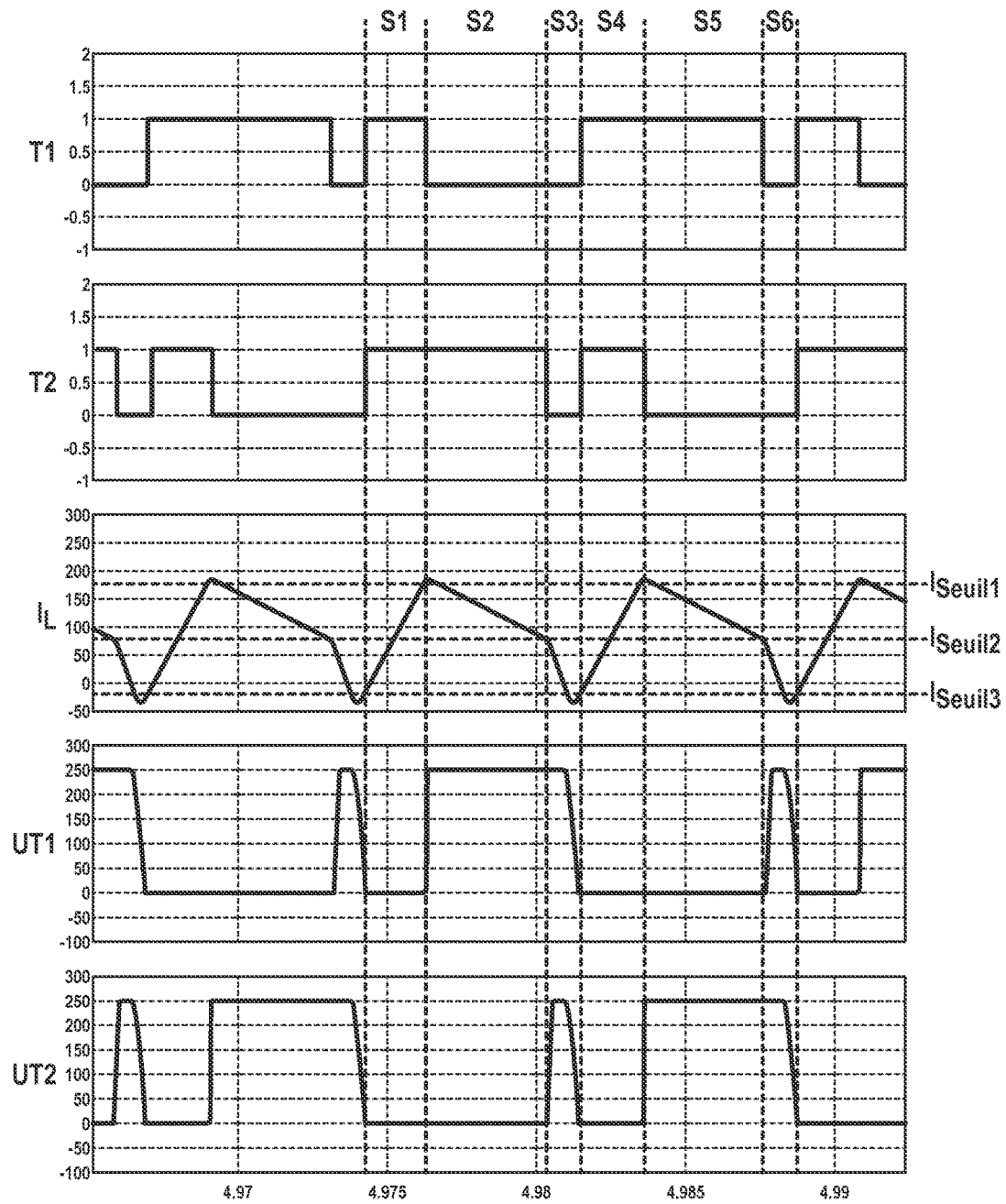
FIGS. 6 and 7 illustrate the sequencing of the switches of an interleaved double boost converter conforming to an embodiment of the present invention.
Figure 7:
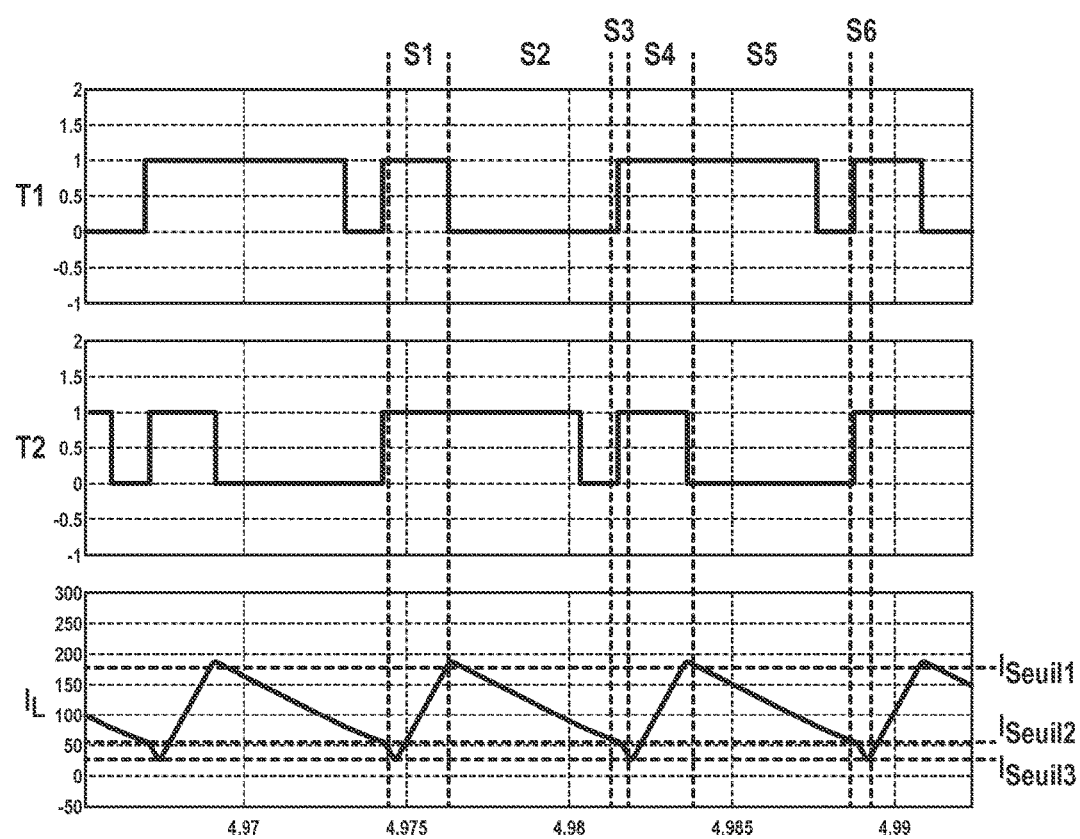

FIGS. 6 and 7 illustrate the status of the first switch in the top part, the status of the second switch in the middle and underneath the inductor current, the voltage at the terminals of the first switch and the voltage at the terminals of the second switch.

More specifically, the control circuit 9 of the switches T1 and T2 is adapted to control the opening and closing of the switches T1 and T2 in accordance with the sequencing described below with reference to FIG. 6.

At an initialisation sequence S0, the initially zero voltage at the terminals of the load is brought to a voltage equal to the voltage Ve at the terminals of the source via a recharging circuit which is known and will not be described herein. The voltage at the terminals of the load is then brought to a voltage equal to twice the voltage Ve during a control sequence of the boost converter that is known and not described herein.

If powering takes place without any load, as is the case in radiology, one possibility is to take advantage of the natural resonance between the input inductor L1 or L2 and the two capacitors C1 and C2, to cause a rise in one single resonance alternation of the voltage Vs at the terminals of the load up to a voltage equal to twice the voltage Ve. This phenomenon is also observed in conventional converters, however it is not desirable in conventional boost converters and although desirable in the double boost converter it is scarcely useable since the current pulse is very high.

It is additionally possible to provide an auxiliary switch and diode which, with the inductor L1, form a step-down converter, to precharge the capacitor C1 to a voltage equal to the voltage Ve at the terminals of the source. In the double boost converter it is possible to precharge the capacitor C1 and C2 to a voltage equal to the voltage Ve at the terminals of the source, by alternately closing the switch T1 or T2 of the opposing converter.

During a first sequence S1 of energy accumulation, the two switches T1 and T2 are closed (on-state) which leads to an increase in current in the inductors L1 and L2 and hence the storage of a quantity of energy in the form of magnetic energy. The diodes D1 and D2 are then blocked and the load is disconnected from the power supply.

When the current $I_{L2}$ circulating in the first inductor L1 exceeds a first threshold value LThreshold_1 fixed by the regulating circuit, the control circuit 9 triggers the opening of the first switch T1.

During a second sequence S2, the first switch is open and the second switch is closed. At a first phase (Phase 2A), the capacitor C1a in parallel with the first switch T1 charges up until the voltage at its terminals reaches one half of the voltage of the voltage at the terminals of the source i.e. S/2. At a second phase (Phase 2B), transfer of energy takes place through the first diode. The first switch T1 being open, the first inductor is then in series with the generator and its electromotive force is added to that of the generator (boost effect). The current passing through the first inductor L1 then passes through the first diode D1, the first capacitor C1 and the load Rch. As a result, there is transfer of the energy accumulated in the first inductor L1 towards the first capacitor C1 through the first diode D1.

The control circuit 9 controls the opening of the second switch before the end of the energy transfer phase through the first diode. For example, when the inductor current $I_L$ circulating in the inductors L1 and L2 falls below a second threshold value LThreshold_2, the control circuit 9 triggers the opening of the second switch T2, this second threshold value being defined by the time constant of the resonant circuit formed by the inductor L1 and the capacitor C1*a* and chosen so that it is reached by the inductor current before the end of the energy transfer phase through the first diode D1.

During a third sequence S3 the two switches are open. At a first phase (Phase 3A), the first inductor L1 enters into resonance with the capacitor C1*a* positioned in parallel with the first switch T1. The capacitor C1*a* positioned in parallel with the first switch T1 discharges until the current passing through it becomes negative. The voltage at the terminals of the first snubber capacitor is then zero. In the absence of the first diode D2, the voltage at the terminals of the first snubber capacitor C1*a* would effectively be equal to E+(E−S)=2E−S, 2E−S being negative since the step-up ratio S/E is higher than 2. In the presence of the first diode D2, the voltage at the terminals of the first snubber capacitor is therefore zero.

When the current $I_L$ circulating in the first inductor L1 falls below a negative third threshold LThreshold_3, the control circuit 9 controls the simultaneous closing of the two switches T1 and T2. The voltage at the terminals of the first snubber capacitor C1*a* being zero on opening of the first switch T1, the switching which occurs is Zero Voltage Switching (ZVS) and hence switching with substantially zero loss.

Alternatively, the closing of the switches T1 and T2 is triggered at a time interval after the opening of the second switch T2. This time interval being defined by the time constant of the resonant circuit formed by the first inductor L1 and the capacitor C1*a* in parallel with the first switch and calculated so as to ensure that the voltage at the terminals of the first snubber capacitor C1*a* is zero on closing of the switches T1 and T2.

The three sequences described above are repeated with reversed roles of the switches T1 and T2.

More specifically, during a fourth sequence S4, the two switches T1 and T2 are again closed. The circuit 100 is again in an energy accumulation phase. The current increases in the inductors L1 and L2 which leads to the storing of a quantity of energy in the form of magnetic energy. The diodes D1 and D2 are then blocked and the load is disconnected from the power supply. When the current $I_L$ circulating in the second inductor L2 moves above the first threshold value LThreshold_1, the control circuit 9 triggers the opening of the second switch T2.

During a fifth sequence S5 the second switch is open, the first switch is closed. At a first phase (Phase 2A), the capacitor C2*a* in parallel with the second switch T2 charges until the voltage at its terminals reaches one half of the voltage at the terminals of the source i.e. S/2. At a second phase (Phase 2B), there is energy transfer through the second diode D2. The second switch T2 being open, the second inductor L2 is then in series with the generator and its electromotive force is added to that of the generator (booster effect). The current passing through the second inductor L2 then passes through the second diode D2, the second capacitor C2 and the load R. The result is transfer of the energy accumulated in the second inductor L2 towards the second capacitor C2.

The control circuit 9 controls the opening of the first switch before the end of the energy transfer phase through the second diode. For example, when the current $I_L$ circulating in the inductors L1 and L2 drops below a second threshold value LThreshold_2, the control circuit 9 triggers the opening of the first switch T2, this second threshold value being defined by the time constant of the resonant circuit formed by the second inductor L2 and the capacitor C2*a* in parallel with the second switch, and is chosen so that it is reached by the inductor current before the end of the energy transfer phase through the second diode.

During a sixth sequence S6 the two switches are open. At a first phase (Phase 3A), the second inductor L2 enters into resonance with the capacitor C2*a* positioned in parallel with the second switch T2. The capacitor C2*a* positioned in parallel with the second switch T2 discharges until the current passing through it becomes negative. The voltage at the terminals of the second snubber capacitor is then zero. When the current $I_L$ circulating in the second inductor L2 falls below a negative third threshold value LThreshold_3, the control circuit 9 controls the simultaneous closing of the two switches T1 and T2. The voltage at the terminals of the second snubber capacitor C2*a* being zero on opening of the second switch T2, the switching which occurs is Zero Voltage Switching (ZVS) and hence switching with substantially zero loss.

The six sequences described above are periodically repeated.

It is to be noted that the controlling of the switches of an interleaved double boost converter 100 described above is only adapted for boost converters having a step-up ratio higher than 2. If the step-up ratio were lower than 2 this would not allow complete discharging of the snubber capacitor, and the ZVS condition would not be met. It is to be noted that the limit of the step-up ratio of 2 can be slightly lowered since the reverse current of the diode provides some help.

It is to be noted that the second threshold value LThreshold_2, triggering the opening of the switch which has remained closed, is a degree of freedom which can be used for secondary applications. It is possible for example to limit frequency variation by acting on the second threshold LThreshold_2 triggering the opening of the switch which has remained closed. The second threshold value LThreshold_2 can be adapted to the load for example. It will be lower for a low load and higher for a high load.

FIGS. 6 and 7 illustrate the sequencing of the switches with different second threshold values LThreshold_2. In the example shown FIG. 7, the second threshold value LThreshold_2 is higher than in the example in FIG. 6. It can be seen that the drop in inductor current is more rapid during resonance. Since the mean current is not equal to the mean of the maximum current and minimum current (unlike the case with bidirectional Boost converters) the adjustment of the second threshold value LThreshold_2 allows the peak current to be reduced, which is particularly important for the rating of inductors which is given by the square of the peak current.

It is known to use auxiliary switches placed in parallel with the diodes. In some cases these switches already exist as in a bidirectional double BOOST/BUCK converter used in particular in vehicle battery chargers or for regenerative braking However the addition of auxiliary switches requires a gate drive circuit. In addition, the bidirectional double BOOST/BUCK converter has a certain number of drawbacks and in particular does not allow cell balancing in multi-cell batteries. An independent charger is preferable moreover with regard to insulation and multiple cell-balancing inputs and outputs, this being all the more the case if the cells are supercapacitors and not batteries. In addition, contrary to the bidirectional double BOOST/BUCK converter, the interleaved double boost converter described above allows limiting of the rated voltage and hence the use of peak repetitive reverse voltage diodes (VRRM) of lower rating (e.g. 500 or 600V) which exhibit fewer switching losses than peak repetitive reverse voltage diodes (VRRM) of higher rating (e.g. 1200V).

The control circuit 9 described herein can be adapted to an assembly comprising several interleaved boost converters mounted in series or in parallel to increase the degree of interleaving.

What is claimed is:

1. An interleaved double boost converter, comprising:
   two simple converters each comprising a diode comprising a cathode and an anode, an input inductor, a switch connected to the anode of the diode, and a filter capacitor connected to the cathode of the diode, the two switches and the two filter capacitors being connected at a mid-point; and
   a control circuit for the two switches, wherein the control circuit is configured to control:
      at a first phase, the opening of one switch of the two switches while the other switch of the two switches remaining closed, both of the two switches initially being closed;
      at a second phase, the opening of the other switch which had remained closed; and
      at a third phase, the closing of both of the two switches.

2. The interleaved double boost converter according to claim 1, further comprising a current sensor configured to measure a current circulating in the input inductors, and to feed the measured current values to the control circuit.

3. The interleaved double boost converter according to claim 1, wherein the cathodes of the diodes are connected to a load, and the control circuit is further configured to regulate a voltage at terminals of the load, and to incorporate a state machine based on the voltage at the terminals of the load, and an inductor current.

4. The interleaved double boost converter according to claim 1, wherein the cathodes of the diodes are connected to a load, and the control circuit is further configured to trigger the opening of the one switch when an inductor current moves above a first threshold value fixed by a voltage regulation circuit at terminals of the load.

5. The interleaved double boost converter according to claim 4, wherein the control circuit is further configured to trigger the opening of the other switch when the inductor current drops below a second threshold value.

6. The interleaved double boost converter according to claim 5, wherein the cathodes of the diodes are connected to a load, the second threshold value being fixed as a function of a load value.

7. The interleaved double boost converter according to claim 5, wherein the closing of the two switches is simultaneous.

8. The interleaved double boost converter according to claim 7, wherein the control circuit is further configured to control a simultaneous closing of the two switches when an inductor current drops below a negative third threshold value.

9. The interleaved double boost converter according to claim 8, wherein the third threshold value being fixed as a function of a load value.

10. An interleaved double boost converter, comprising:
    two simple converters each comprising a diode comprising a cathode and an anode, an input inductor, a switch connected to the anode of the diode, and a filter capacitor connected to the cathode of the diode, the two switches and the two filter capacitors being connected at a mid-point;
    a control circuit for the two switches, wherein the control circuit is configured to control:
       at a first phase, the opening of one switch of the two switches while the other switch of the two switches remaining closed, both of the two switches initially being closed;
       at a second phase, the opening of the other switch which had remained closed; and
       at a third phase, the closing of both of the two switches; and
    a snubber capacitor placed in parallel with each of the two switches.

11. An X-ray generator, comprising:
    an interleaved double boost converter for a high voltage powering of the X-ray generator, wherein the interleaved double boost converter comprises:
    two simple converters each comprising a diode comprising an anode and a cathode, an input inductor, a switch connected to the anode of the diode, and a filter capacitor connected to the cathode of the diode, the two switches and the two filter capacitors being connected at a mid-point; and
    a control circuit for the two switches, wherein the control circuit is configured to control:
       at a first phase, the opening of one switch of the two switches while the other switch of the two switches remaining closed, both of the two switches initially being closed;
       at a second phase, the opening of the other switch which had remained closed; and
       at a third phase, the closing of both of the two switches.

12. The X-ray generator according to claim 11, further comprising a snubber capacitor placed in parallel with each of the two switches.

* * * * *